United States Patent Office 3,297,540
Patented Jan. 10, 1967

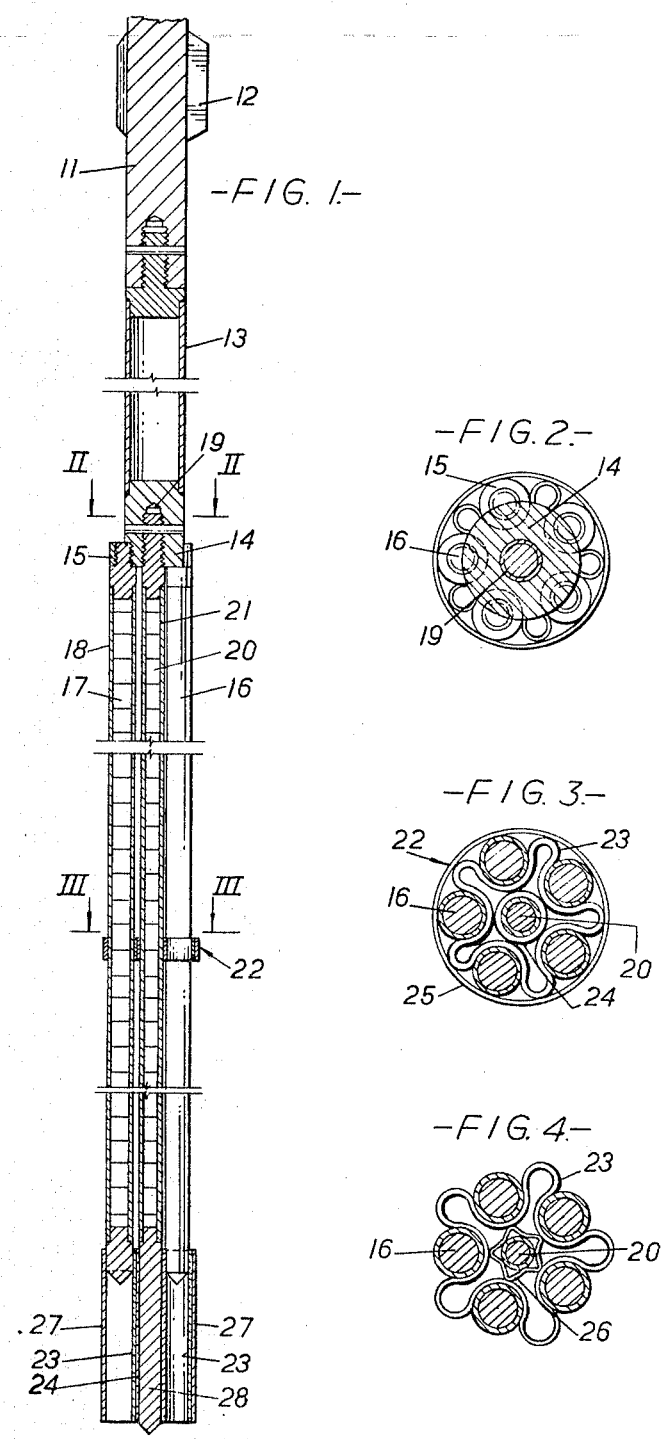

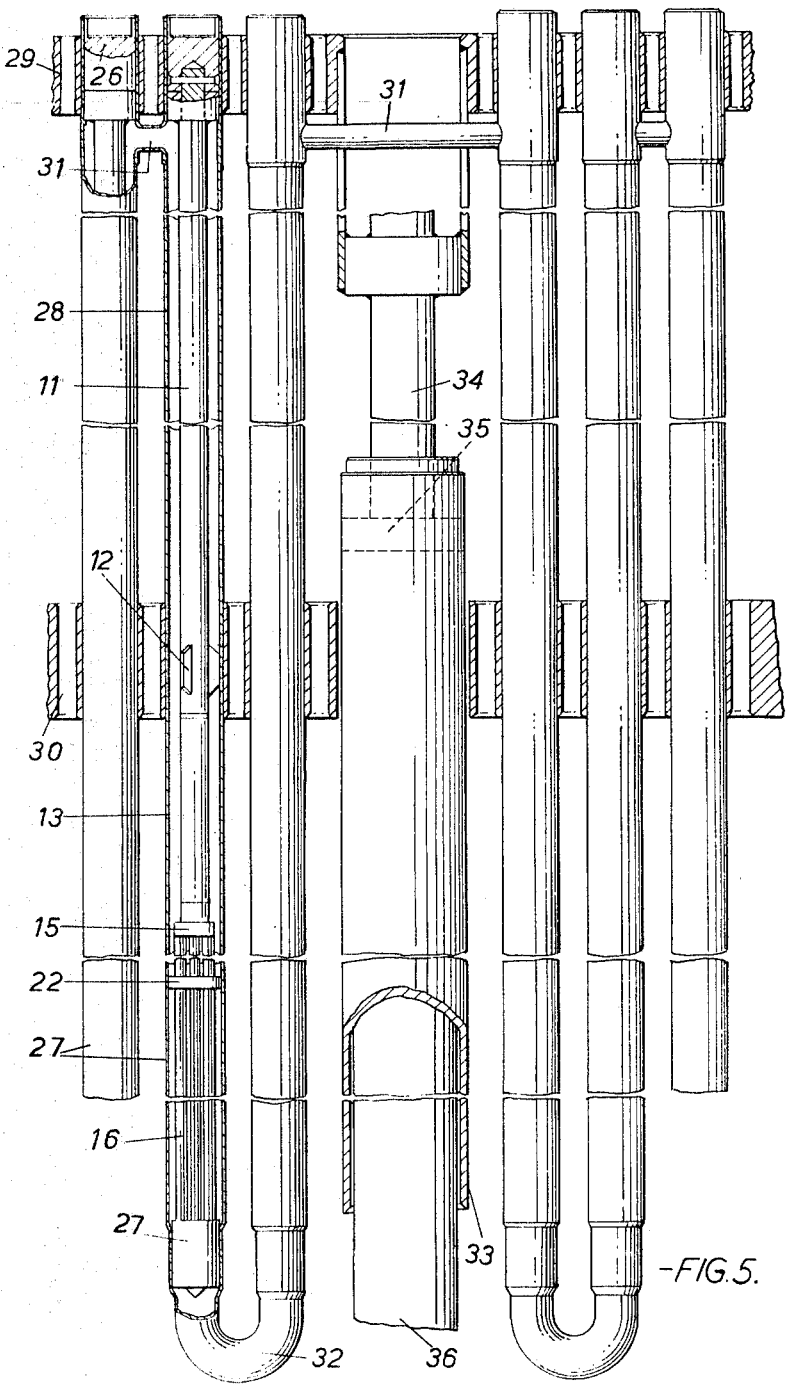

3,297,540
NUCLEAR REACTOR FUEL ELEMENT
ASSEMBLIES
Ronald Peter Williams, Frodsham, near Warrington, and David John Ashcroft, Horwich, Bolton, England, assignors to United Kingdom Atomic Energy Authority, London, England
Filed Aug. 26, 1963, Ser. No. 304,341
Claims priority, application Great Britain, Sept. 5, 1962, 34,103/62
5 Claims. (Cl. 176—44)

The present invention relates to fuel element assemblies for nuclear reactors of the kind in which the assembly is pervaded by fluid moderator. A nuclear reactor of this kind is one cooled by water; the aqueous coolant is either allowed to boil in passing through the core of the reactor or is maintained under a sufficient pressure to suppress boiling. In either case, fuel elements grouped into assemblies for ease of handling and positive location are generally open to the flow of coolant, which, having moderator properties, ensures that moderator is present between the various components of the assembly.

It is generally the case at present that nuclear reactors have an internal conversion ratio less than one, that is to say, in operation they do not achieve in the core itself a conversion of fertile to useful fissile material which is sufficient to make good the consumption of fissile material installed initially. Consequently, the tendency is for the reactivity of the core to decrease with continuing operation and to prevent its becoming sub-critical there must be an initial excess of reactivity invested in the core. The larger the initial excess, the longer is the expectation of life of the fuel charge, but against this, and its attendant advantages of high burn-up of the fuel and hence economical power generation, is the difficulty of controlling large excess reactivities. Movable neutron absorber elements are customarily employed in the form of control rods to control the excess reactivity, but it is then necessary to provide mechanism for drawing these rods out of the core during the life of the charge.

A known alternative for controlling the initial excess reactivity is to have neutron absorber installed as a permanency in the core in the roll of what is known as a burnable poison. The ideal is that this neutron absorbing poison should be converted by such absorption to an isotope of lower capture cross section for neutrons and at such a rate as to keep constant the reactivity of the core. In practice, however, some mismatch between the rate of depletion of the poison and the decrease of reactivity seems inevitable and therefore one only expects of a burnable poison that it will keep the reactivity constant, within limits, for a certain period of operation.

Since movable absorber elements are still necessary for shutting down the reactor and possibly for operational control, the burnable poison and the movable absorber are preferably used together in controlling the initial excess reactivity so as to reduce the poison requirement.

According to the present invention a nuclear fuel assembly for a nuclear reactor of the kind wherein such assembly is pervaded by fluid moderator, as in a reactor cooled by water, is characterized by a rod without fuel but containing burnable poison which rod has arranged around it on parallel axes at least three rod-shaped fuel elements spaced equally from the burnable poison rod, the fuel elements and the burnable poison rod being held together as a unitary structure. A practical arrangement is for the fuel elements to be on axes equispaced around a circle; conveniently, the bunable poison rod is co-extensive with the fuel elements. Since the length of the assembly is likely to be large relative to the cross section of the fuel elements and the burnable poison rod, transverse stiffening is desirable and may be provided by arranging at intervals along the length a spacer grid which is formed of metal strip.

The invention will be further described by way of example with reference to the accompanying drawings showing particular embodiments. In these drawings:

FIGURE 1 is an elevation partly in section,
FIGURE 2 is a cross section on the line II—II of FIGURE 1,
FIGURE 3 is a cross section on the line III—III of FIGURE 1,
FIGURE 4 is a cross section similar to FIGURE 3 but showing a modification, and
FIGURE 5 is an elevational view, partly sectioned, of a nuclear reactor core including the embodiment of FIGURE 1.

As illustrated in FIGURE 1, the fuel element assembly is for suspension in a vertical attitude in a reactor core and at the end which is to be uppermost has a solid rod 11 with three symmetrically arranged, radially projecting locating ribs of which one, denoted 12, appears in FIGURE 1, this rod being joined by a hollow extension piece 13 of a zirconium alloy selected from the range known as Zircaloy to a block 14 having a ring of five equispaced lobes, such as 15, each bored and tapped to receive the threaded top end of a rod-shaped fuel element, such as 16.

The five fuel elements are identical; each is composed of stacked pellets of uranium dioxide, as seen at 17, which are sheathed by a tube 18, the sheathing material in this case being stainless steel. Typical dimensions for the tube outer diameter and thickness are 0.330 inch and 0.015 inch respectively. The fuel element length would be several feet.

Also in the block 14 is a central blind bore 19 which is tapped to receive the threaded top end of a rod 20 containing burnable poison. This rod is situated at the center of the circle through the five fuel elements and is on a parallel axis; as sheathing it has a tube 21 of the same material as the extension piece 13. The filling of the tube is in the form of pellets shaped similarly to those in the fuel elements and the poison-containing composiiton of these pellets may be of a cermet or entirely ceramic character. For example, zirconium diboride or boron carbide, possibly enriched in the boron 10 isotope, is dispersed uniformly as fine particles or discontinuously as nodules in a matrix of zirconium. Whether the dispersion is uniform or discontinuous depends on the degree of self-shielding from neutrons which is desirable in the burnable poison to approximate most closely to the requisite rate of poison consumption. In the present case, the burnable poison rod is of smaller diameter than the fuel elements, say 0.24 inch outer diameter, but is approximately the same length.

At intervals along the length of the fuel elements, there are spacer grids, such as 22, which are formed of metal strip, the metal being Zircaloy for example. Referring to FIGURE 3, a closed lobed shape 23 is formed by an endless length of strip being bent transversely of its width, the number of lobes being five so that the fuel elements are accommodated between them. The burnable poison rod 20 is disposed within the closed shape and co-extensive with the spider has a collar 24 which engages the inner surfaces of the re-entrant portions between the lobes. Thus, the fuel elements and burnable poison rod are supported relative to one another, there being a sleeve 25 of slightly thicker gauge than the lobed strip which sleeve encircles the fuel elements and so holds them in position between the lobes.

Referring to FIGURE 4, the modified spacer grid shown therein has lobes projecting to a greater radial extent and the fuel elements 16 are retained in position between them by brazed joints so that the outer sleeve 25 of FIGURE 3 is omitted. In place of the collar 24 of FIGURE 3 a rosette 26 of strip metal is disposed around the burnable poison rod 20, the rosette having five tips engaged with the adjoining portions of the strip metal shape 23 and the re-entrant portions between the tips being engaged with the burnable poison rod.

The lower end fitting of the fuel element assembly is constituted by an elongated form of the spacer grid used at the intermediate positions, although in the case of the grid of FIGURE 4 the lobes are shortened for fitting into an end sleeve 27 as seen in FIGURE 1. A bottom end plug 28 of the burnable poison rod 20 is longer than those of the fuel elements so that together with a corresponding length of collar 24 or rosette 26, as the case may be, it provides central support for the extended length of grid.

The illustrated fuel element assembly is for use in a reactor cooled by water; more particularly it is designed for use in a water-cooled reactor as described in copending application 113,734 now U.S. Patent No. 3,184,31.

Such use is illustrated in FIGURE 5 where the fuel element assemblies are seen to be suspended from top plugs 26 inside tubes which, although of one continuous length, are conveniently regarded as each being composed of a fuel tube 27 and an extension tube 28. Spacing of these tubes in accordance with a lattice pattern is maintained by apertured transverse support plates 29 and 30. The tubes are connected in pairs at the top by branches 31 and at the btttom by U-bend connectors 32 to establish a series flowpath for circulation through the tubes of a primary coolant which is pressurised light water. A secondary coolant, which is also light water, passes upwardly over the exterior surfaces of the tubes and is allowed to boil to generate an output of steam from the reactor. The primary coolant therefore acts as an intermediary heat transfer medium between the fuel and the boiling water and being pressurised against boiling affords a degree of constant moderation to supplement the moderation of the secondary coolant.

It is to be understood that the complete reactor core has a far greater number of parallel tubes than appears in FIGURE 5 and that series flow paths as previously mentioned are connected in parallel in a closed circuit for the primary coolant. At certain locations in this core, there are vacancies in the lattice pattern for tubular neutron absorber rods, such as the one indicated 33. These absorber rods are movable hydraulically into and out of the vacancy by fitting the rod as a closed-top cylinder on a fixed piston rod 34 having a piston 35, the piston rod being hollow and having, adjacent the piston, parts (not shown) by which pressurised coolant can be supplied through the piston rod to the interior of the cylinder for lifting the absorber rod out of the core from the inserted position as illustrated. Release of the pressurised coolant from the cylinder enables the absorber rod to return into the core. The disclosure herein of the hydraulic moving mechanism has been purposely simplified because this mechanism of itself is no part of the invention; if the absorber rod is to serve for control purposes, as distinct from merely being fully inserted or withdrawn as in the case of a shut-off rod, means would be included in the mechanism for continuous or stepwise adjustment of the rod position. The tubular absorber rod 33 is slidable over a filler element 36 fixed upright in the reactor core, this element being a sheathed body of material having a lower neutron slowing down power than the light water employed as coolant; for present purposes the material chosen is graphite.

The configuration above described where the fuel assemblies bound a vacancy for a tubular neutron absorber rod has been found surprisingly to increase the effective reactivity controlling worth of the absorber rod as a result of the inclusion of the burnable poison rods in the assemblies. Thus calculation has indicated that the burnable poison when arranged in this way does not compete adversely with the absorber rod for neutrons; on the contrary, a more efficient use of the absorber rod is obtained.

Other advantages arising from the invention are that, with the fuel assembly pervaded with moderator, a high degree of neutron absorbing efficiency is obtained in the burnable poison and that each fuel element is subject to the same neutron flux pattern because of the uniform spacing from the burnable poison rod.

To make use of the burnable poison for adjustment of the neutron flux profile either radially or axially of the reactor a zoning technique may be employed whereby burnable poison rods having different poison concentrations are placed in different parts of the core for radial zoning and for axial zoning either various lengths of rod are used or the poison concentration is varied along the rod length.

What we claim is:

1. A nuclear reactor having a core of the kind which is cooled by fluid moderator and of which the fuel content is in rod-shaped fuel element spaced apart from one another for pervasion by the fluid moderator, characterized by unfuelled rods containing burnable poison which are arranged in the core on axes parallel to the fuel elements to place every element in equal proximity to the burnable poison rods, but to only one poison rod in each case, the burnable poison rods being assembled together with the fuel elements into unitary structures.

2. A nuclear fuel assembly for a nuclear reactor of the kind wherein such assembly is pervaded by fluid moderator, as in a reactor cooled by water, said assembly having at least three rod-shaped fuel elements, characterized by a rod without fuel but containing burnable poison, around which rod all the elements of the assembly are arranged on parallel axes spaced from one another for pervasion by the fluid moderator and with equal spacing from the burnable poison rod, and means holding the fuel elements and the burnable poison rod together as a unitary structure.

3. A nuclear fuel assembly as claimed in claim 2, in which the axes of the fuel elements are equispaced around a circle.

4. A nuclear fuel assembly as claimed in claim 2, in which the burnable poison rod is co-extensive with the fuel elements.

5. A nuclear fuel assembly as claimed in claim 2, in which the poison concentration varies along the length of the burnable poison rod.

References Cited by the Examiner

UNITED STATES PATENTS

| 2,806,820 | 9/1957 | Wigner | 176—54 |
| 2,984,613 | 5/1961 | Bassett | 176—68 |
| 3,049,484 | 8/1962 | Zinn. | |
| 3,087,881 | 4/1963 | Treshow | 176—54 |
| 3,105,026 | 9/1963 | Dickson | 176—78 X |
| 3,137,636 | 6/1964 | Wikner. | |

CARL D. QUARFORTH, *Primary Examiner.*

REUBEN EPSTEIN, LEON D. ROSDOL, *Examiners.*

R. L. GRUDZIECKI, *Assistant Examiner.*